(12) United States Patent
Nakano (10) Patent No.: US 10,970,000 B2
(45) Date of Patent: Apr. 6, 2021

(54) MEMORY SYSTEM

(71) Applicant: Toshiba Memory Corporation, Tokyo (JP)

(72) Inventor: Takeshi Nakano, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 53 days.

(21) Appl. No.: 16/270,572

(22) Filed: Feb. 7, 2019

(65) Prior Publication Data
US 2020/0042241 A1 Feb. 6, 2020

(30) Foreign Application Priority Data
Aug. 3, 2018 (JP) .............................. JP2018-146439

(51) Int. Cl.
*G06F 3/06* (2006.01)
*G06F 11/07* (2006.01)

(52) U.S. Cl.
CPC .......... *G06F 3/0659* (2013.01); *G06F 3/0619* (2013.01); *G06F 3/0679* (2013.01); *G06F 11/0727* (2013.01); *G06F 11/0751* (2013.01); *G06F 11/0769* (2013.01)

(58) Field of Classification Search
CPC ...... G06F 3/061; G06F 3/0613; G06F 3/0619; G06F 3/0659; G06F 12/0246; G06F 12/0238
See application file for complete search history.

(56) References Cited

U.S. PATENT DOCUMENTS

| 8,006,030 | B2 * | 8/2011 | Nakamura | .......... G06F 11/1068 711/103 |
| 8,880,980 | B1 * | 11/2014 | Mathew | ................ H03M 13/15 714/764 |
| 9,076,530 | B2 | 7/2015 | Gomez et al. | |
| 2013/0081144 | A1 | 3/2013 | Kambayashi | |
| 2015/0278037 | A1 | 10/2015 | Wada | |
| 2019/0324903 | A1 * | 10/2019 | Yoon | ................... G06F 12/0246 |
| 2020/0014544 | A1 * | 1/2020 | Sela | ...................... H04L 9/0891 |

FOREIGN PATENT DOCUMENTS

| JP | S61-117640 A | 6/1986 |
| JP | 2013-069250 A | 4/2013 |

* cited by examiner

*Primary Examiner* — Matthew M Kim
*Assistant Examiner* — Kurosu Risa Altaf
(74) *Attorney, Agent, or Firm* — Foley & Lardner LLP (57) ABSTRACT

A memory system includes a non-volatile memory having a memory cell array which stores data in a non-volatile manner, and a memory controller which transfers data received from a host to the non-volatile memory in parallel with execution of an operation of verifying validity of the data. A corresponding method is also described.

14 Claims, 5 Drawing Sheets

MEMORY SYSTEM

CROSS-REFERENCE TO RELATED APPLICATIONS

This application is based upon and claims the benefit of priority from Japanese Patent Application No. 2018-146439, filed Aug. 3, 2018, the entire contents of which are incorporated herein by reference.

FIELD

Embodiments described herein relate generally to a memory system.

BACKGROUND

In recent years, the capacity of a NAND type flash memory which is a non-volatile memory is increased and as a memory system with this NAND type flash memory mounted therein, a solid state drive (SSD) is attracting attention.

In devices such as a PC, a tablet PC, and a smartphone, in which an SSD is mounted therein, it is important to ensure security to prevent unauthorized rewriting of data into a non-volatile memory and the like. Therefore, an operation of verifying the validity of data may be performed on written data transferred from the outside. It takes time for such an operation, and the time for a write process to the non-volatile memory is required.

DETAILED DESCRIPTION

Embodiments provide a memory system capable of speeding up a write process accompanying an operation of verifying the validity of data.

In general, according to at least one embodiment, provided is a memory system including a non-volatile memory having a memory cell array which stores data in a non-volatile manner, and a memory controller which transfers data received from a host to the non-volatile memory in parallel with execution of an operation of verifying validity of the data.

Hereinafter, the present disclosure will be described in detail with reference to the drawings. The present disclosure is not limited to the following embodiments. In addition, the components in the following embodiments include those that can be easily conceived by those skilled in the art or those that are substantially the same.

A memory system 1 of an embodiment will be described using FIGS. 1 to 4.

Configuration Example of Memory System

Figure 1:
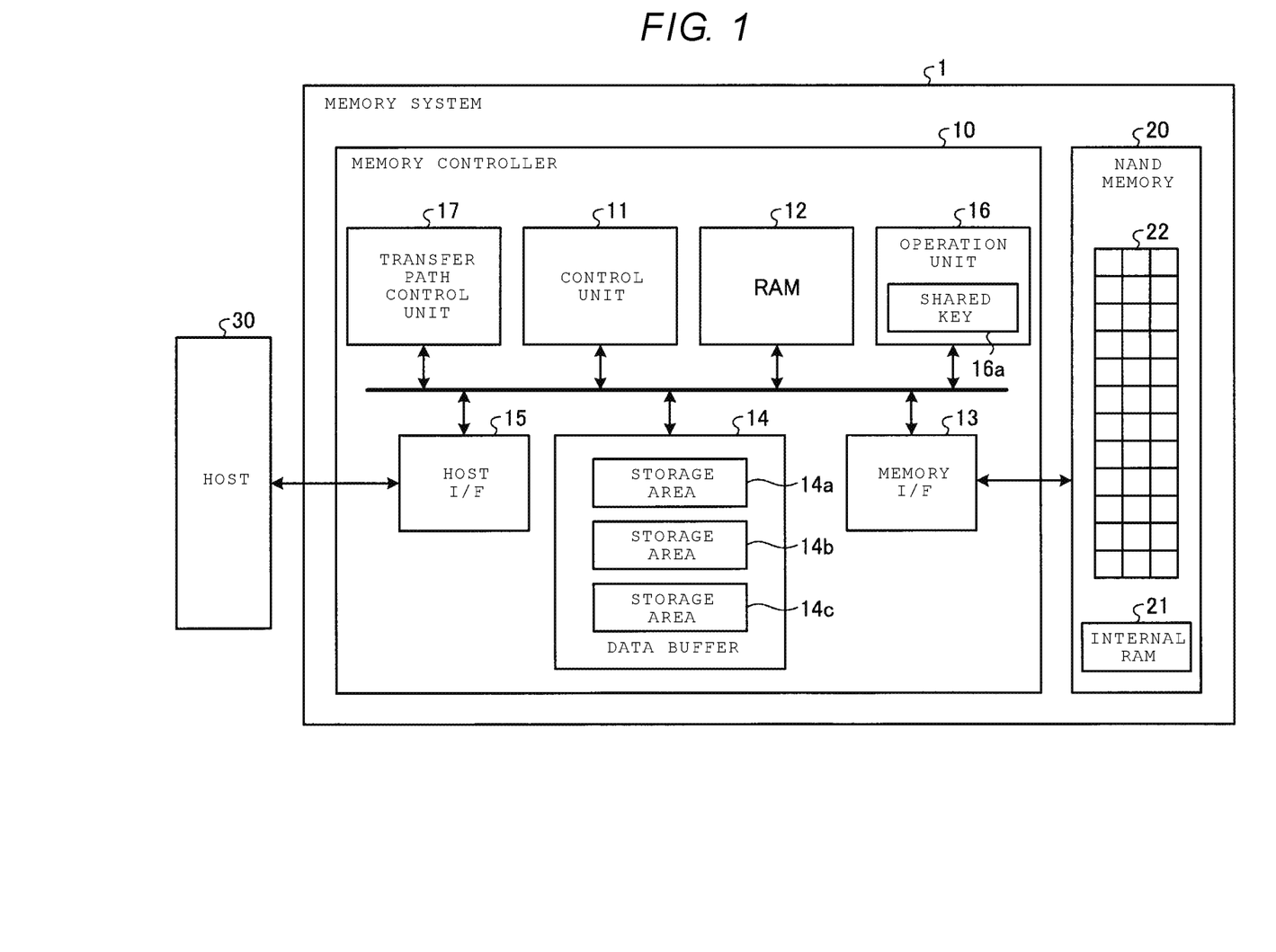
FIG. 1 is a block diagram illustrating a schematic configuration example of a memory system according to at least one embodiment.

FIG. 1 is a block diagram illustrating a schematic configuration example of the memory system 1 according to the embodiment. As illustrated in FIG. 1, the memory system 1 includes a memory controller 10 and a NAND type flash memory 20 (hereinafter, simply referred to as a NAND memory 20) as a non-volatile memory.

The memory system 1 may be a memory card in which the memory controller 10 and the NAND memory 20 are configured as one package or may be a solid state drive (SSD) or the like. The memory system 1 is connectable to a host 30. For example, the host 30 may be an information processing device such as a personal computer, a server or a storage box, a mobile phone, or an imaging device, may be a portable terminal such as a tablet computer or a smartphone, may be a game device, or may be an in-vehicle terminal such as a car navigation system.

The NAND memory 20 includes non-volatile memory cells which store data in a non-volatile manner. In the following description, a case where NAND memory cells is used as non-volatile memory cells will be described. It should be noted that the example of the non-volatile memory cell is not limited thereto. For example, the non-volatile memory cell may be any of various storage media such as a NOR type flash memory cell, a three-dimensional structure flash memory cell, a resistance random access memory (ReRAM) cell, and a ferroelectric random access memory (FeRAM) cell. The non-volatile memory cell is not necessarily a semiconductor memory cell and the embodiment is applicable to various storage media other than the semiconductor memory cell.

The NAND memory 20 includes an internal random access memory (RAM) 21. The internal RAM 21 functions as an internal buffer for temporarily storing data transferred from the host 30 via the memory controller 10. In addition, the NAND memory 20 includes a memory cell array 22 in which the above-mentioned non-volatile memory cells are arranged in a matrix. The data from the host 30 is stored in the memory cell array 22 in a non-volatile manner.

For example, the memory controller 10 is a semiconductor integrated circuit configured as a system-on-a-chip (SoC). The memory controller 10 controls data writing to the NAND memory 20 according to a write request from the host 30. According to a read request from the host 30, the memory controller controls data reading from the NAND memory 20.

The memory controller 10 includes a control unit 11, a RAM 12, a memory interface (memory I/F) 13, a data buffer 14, a host interface (host I/F) 15, an operation unit 16, and a transfer path control unit 17. The control unit 11, the RAM 12, the memory I/F 13, the data buffer 14, the host I/F 15, the operation unit 16, and the transfer path control unit 17 are connected to one another via an internal bus.

The host I/F 15 executes a process according to the interface standard with the host 30 and outputs a request, data to be written (user data), and the like received from the host 30 to the internal bus. Further, the host I/F 15 transmits the data (user data) read from the NAND memory 20, a response from the control unit 11, and the like to the host 30. The control unit 11 described later may have some or all of the functions of the host I/F 15. That is, the control unit 11 may directly exchange information with the host 30.

The memory I/F 13 performs a data write process to the NAND memory 20 based on an instruction of the control unit 11. Further, the memory I/F 13 performs a data read process from the NAND memory 20 based on an instruction of the control unit 11. The control unit 11 described later may have some or all of the functions of the memory I/F 13. That is, the control unit 11 may directly exchange information with the NAND memory 20.

The data buffer 14 includes a plurality of storage areas 14a, 14b, and 14c and the like. The data buffer 14 temporarily stores the data received from the host 30 in any of the plurality of storage areas 14a, 14b, and 14c until the memory controller 10 stores the data to the NAND memory 20. The data buffer 14 temporarily stores the data read from the NAND memory 20 in any of the plurality of storage areas 14a, 14b, and 14c until the data is transmitted to the host 30. In the data buffer 14, a general purpose memory, for example, a static random access memory (SRAM), a dynamic random access memory (DRAM), or the like may be used.

The transfer path control unit 17 controls a transfer destination of the data temporarily stored in the storage areas 14a to 14c of the data buffer 14. The transfer destination of the data is the operation unit 16 and the internal RAM 21 of the NAND memory 20. The control unit 11 described later may have some or all of the functions of the transfer path control unit 17.

The operation unit 16 executes an operation of verifying the validity of data on the data from the host 30 transferred from the transfer path control unit 17. There is no particular limitation on the operation method. For example, when a universal flash storage (UFS) standard or an embedded multi-media-card (eMMC) standard is applied to the NAND memory 20, a reply protected memory block (RPMB) is defined in the memory system 1. In the RPMB, the operation unit 16 holds a shared key 16a to be shared with the host 30 and by performing a hash operation by the operation unit 16 using the shared key 16a, the validity of the data from the host 30 is verified. In this case, the operation unit 16 is a secure hash algorithm (SHA) 256 operation circuit or the like. Additionally, the operation unit 16 may be a cyclic redundancy check (CRC) operation circuit by protection information (PI) using a different operation method or the like. Further, the control unit 11 described later may have some or all of the functions of the operation unit 16. For example, the operation unit 16 may perform a hash operation and the control unit 11 may verify the validity of the data from the host 30.

The control unit 11 is configured as, for example, a central processing unit (CPU). The control unit 11 may operate based on a firmware program. For example, the firmware program is stored in the NAND memory 20 in advance when the memory system 1 is manufactured or released. The control unit 11 loads the firmware program from the NAND memory 20 to the RAM 12 in the memory controller 10 when the memory system 1 is turned on. The control unit 11 realizes various functions by executing the firmware program loaded in the RAM 12.

In this manner, some or all of the functions of the control unit 11 are realized by the CPU by, for example, executing the firmware program. However, some or all of the functions of the control unit 11 may be realized by a hardware circuit, not by the CPU that executes the firmware. For example, the memory controller 10 may include a field-programmable gate array (FPGA) or application specific integrated circuit (ASIC), and some or all of the functions of the control unit 11 may be executed by the FPGA or ASIC.

The control unit 11 comprehensively controls various components of the memory system 1. When a request is received from the host 30 via the host I/F 15, the control unit 11 performs control according to the request. For example, the control unit 11 instructs the memory I/F 13 to write data to the NAND memory 20 according to the write request from the host 30. Further, the control unit 11 instructs the memory I/F 13 to read the data from the NAND memory 20 according to the read request from the host 30.

Further, when the write request is received from the host 30, the control unit 11 instructs the transfer path control unit 17 to transfer the data to be stored in the data buffer 14 to any of the operation unit 16 and the internal RAM 21 of the NAND memory 20. Then, the control unit instructs the operation unit 16 to perform an operation of verifying the validity of the data transferred to the operation unit 16.

Further, the control unit 11 determines a storage area (for example, an area in the memory cell array 22) on the NAND memory 20 for the data stored in the data buffer 14. That is, the control unit 11 manages a write destination of the data. The correspondence information between a logical address of the data received from the host 30 and a physical address indicating the storage area on the NAND memory 20 in which the data is stored as an address conversion table.

Further, when a read request is received from the host 30, the control unit 11 converts the logical address designated by the read request into a physical address using the above-described address conversion table, and instructs the memory I/F 13 to perform data reading from the physical address.

Operation Example of Memory System

Figure 2A:
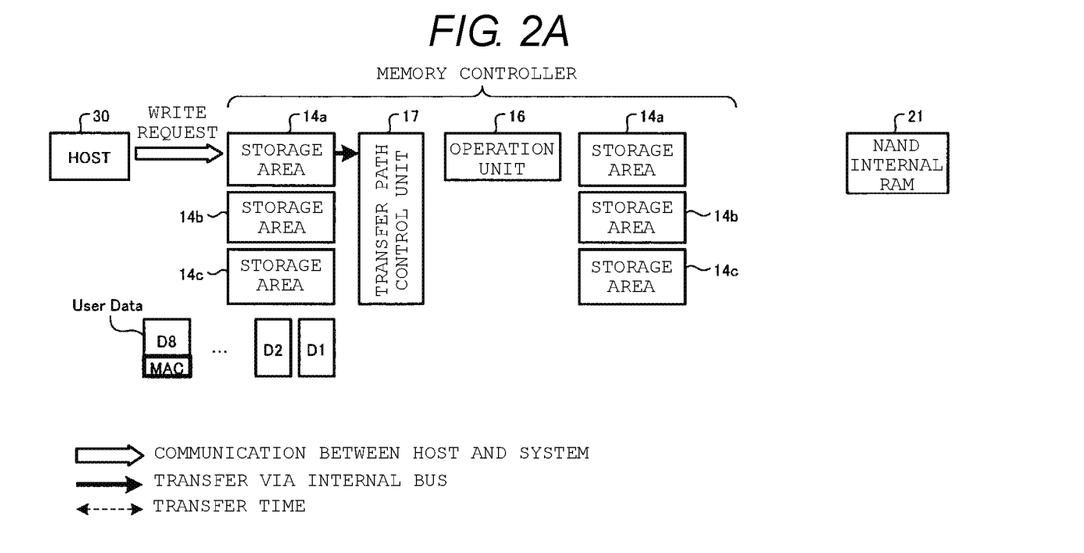
FIGS. 2A to 2C are flowcharts illustrating examples of a data processing operation of the memory system according to at least one embodiment as block diagrams.
Figure 2B:
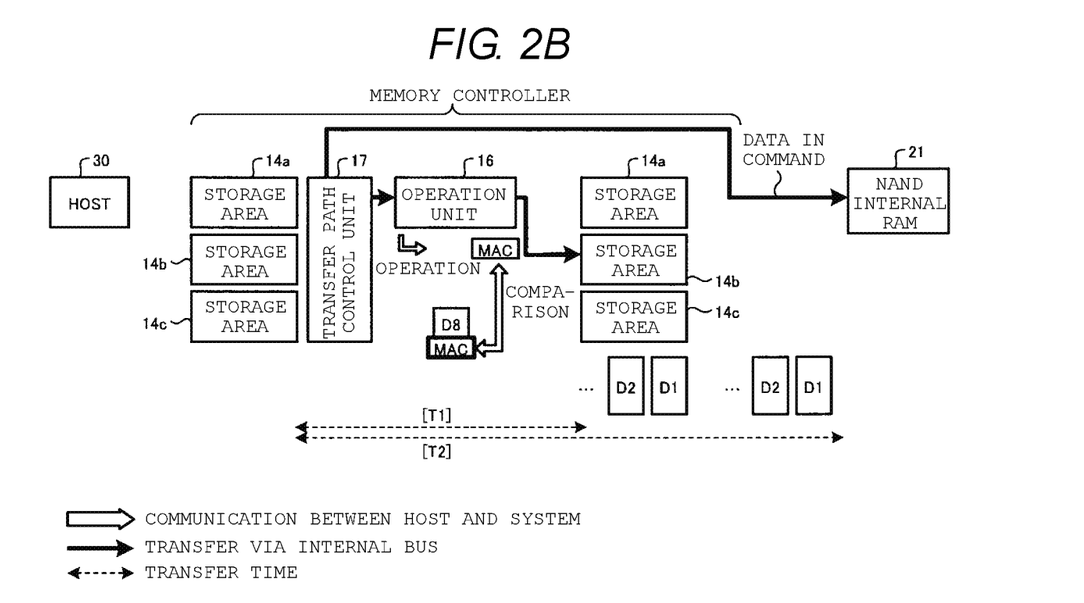
Figure 2C:
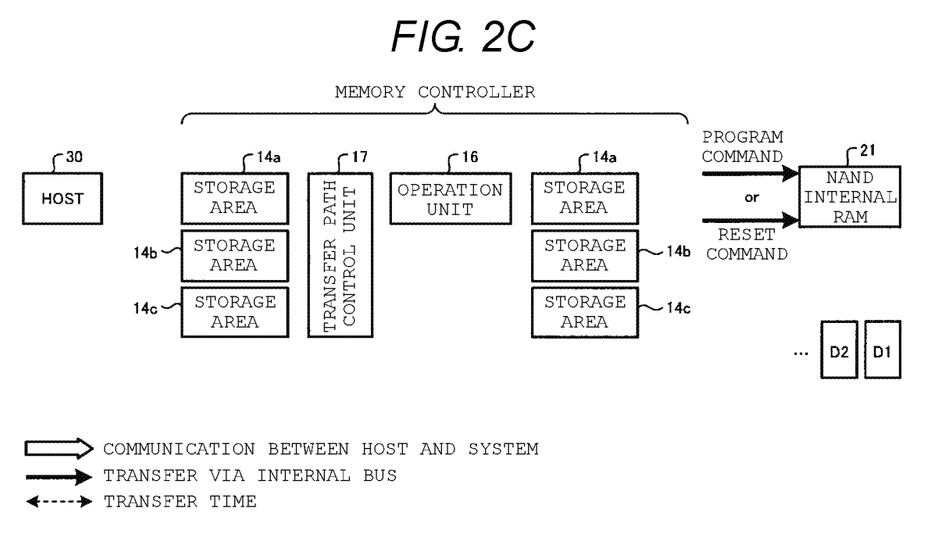

Next, using FIGS. 2A to 2C, when a write request is received from the host 30, an example of a data processing operation of the memory system 1 will be described. FIGS. 2A to 2C are flowcharts illustrating examples of a data processing operation of the memory system 1 according to the embodiment as block diagrams. It is assumed that the host 30 sends the shared key necessary for verifying the data to the memory system 1 in advance.

As illustrated in FIG. 2A, the host 30 issues a write request to the memory system 1, divides the user data into a plurality of frames, and transfer the data. In the example of FIGS. 2A to 2C, each of 8 pieces of data D1 to D8 having a predetermined size is set to one frame and the data D1 to D8 as the user data is transferred. Among the 8 pieces of data D1 to D8, a hashed message authentication code (MAC) value by the host 30 is given to the eighth data D8. The hash operation is an operation method for generating a sequence that summarizes the data from certain data. The MAC value is obtained by performing a hash operation on each of the data D1 to D8 using the shaped key. In this manner, the user data used herein is a set of data having 8 frames as one set, and indicates a set of data with a size designated from the host 30 by one write request and a size protected by one MAC value.

The data D1 to D8 transferred to the memory system 1 are temporarily stored in, for example, the storage area 14a of the data buffer 14. The data D1 to D8 temporarily stored in the storage area 14a are acquired by the transfer path control unit 17.

As illustrated in FIG. 2B, the data D1 to D8 acquired by the transfer path control unit 17 are transferred to the operation unit 16 by the transfer path control unit 17. The data D1 to D8 transferred to the operation unit 16 are subjected to a hash operation by the operation unit 16 using the shared key 16*a*, and a MAC value is derived independently from the host 30. The operation unit 16 compares the MAC value obtained by the operation unit itself with the MAC value obtained by the host 30 and given to the data D8. When the two MAC values match, it can be said that the data D1 to D8 transferred from the host 30 are not modified and the operation unit 16 authenticates the validity of the data D1 to D8. When the two MAC values do not match, there is a possibility that the data D1 to D8 may be subjected to invalid modification and thus the operation unit 16 denies the validity of the data D1 to D8. The control unit 11 may compare the MAC value obtained by the operation unit 16 with the MAC value obtained by the host 30 to authenticate or deny the validity.

For example, the hashed data D1 to D8 are temporarily stored in the storage area 14*b* of the data buffer 14.

The data D1 to D8 acquired by the transfer path control unit 17 are further transferred to the internal RAM 21 of the NAND memory 20 from the transfer path control unit 17 via the memory I/F 13 and are temporarily stored. This operation is executed by issuing a data-in command for the data D1 to D8 temporarily stored in the storage area 14*a* to the NAND memory 20 by the memory controller 10. The data-in command is a command for transferring predetermined data to the NAND memory 20, and the data transfer to the NAND memory 20 does not involve a program to the memory cell array 22. The program to the memory cell array 22 means that the data in the internal RAM 21 is stored in the memory cell array 22 in a non-volatile manner. The data D1 to D8 temporarily stored in the internal RAM 21 are programmed in the memory cell array 22 as appropriate after the validity is authenticated by the hash operation of the operation unit 16 as described later.

Here, the time until the data D1 to D8 are transferred from the storage area 14*a* to the operation unit 16 via the transfer path control unit 17, the time required for the hash operation in the operation unit 16, and the time for transferring the hashed data D1 to D8 from the operation unit 16 to the storage area 14*b* are collectively set to time T1.

Further, the time until the data D1 to D8 are transferred from the storage area 14*a* to the internal RAM 21 of the NAND memory 20 via the transfer path control unit 17 is set to time T2. At this time, the data D1 to D8 are transferred from the storage area 14*a* to the internal RAM 21 within the time T1. That is, it is to be noted that time T2<time T1, and the length of arrows of the time T2 and T1 in FIG. 2B do not represent the length of time.

As illustrated in FIG. 2C, when the validity of the data D1 to D8 as the user data are authenticated by the operation unit 16, the memory controller 10 appropriately issues a program command for the user data whose validity is authenticated to the NAND memory 20. The program command from the memory controller 10 is a command for causing the NAND memory 20 to program the user data temporarily stored in the internal RAM 21 in an area within a predetermined memory cell array 22 (to store the data in a non-volatile manner). As a result, the write request from the host 30 is executed. Here, it is assumed that the size of one piece of user data including the data D1 to D8 is a size that can be stored in the internal RAM 21 of the NAND memory 20.

When the validity of the data D1 to D8 as the user data is denied by the operation unit 16, the memory controller 10 issues a reset command for the user data whose validity is denied to the NAND memory 20. The reset command from the memory controller 10 is a command for causing the NAND memory 20 to erase the user data temporarily stored in the internal RAM 21 without programming. Thus, the write request from the host 30 is canceled. Accordingly, the NAND memory 20 returns to a command standby state in which the next command can be received. Then, information that the MAC values do not coincide with each other in the memory controller 10 is retained. When a write result confirmation request is received from the host 30, the memory controller transmits an error notification to the host 30. Alternatively, even when there is no write result confirmation request from the host 30, the memory controller may transmit the error notification to the host 30 as appropriate.

Thus, the data processing operation of the memory system 1 is completed.

Processing Example of Memory System

Figure 3:
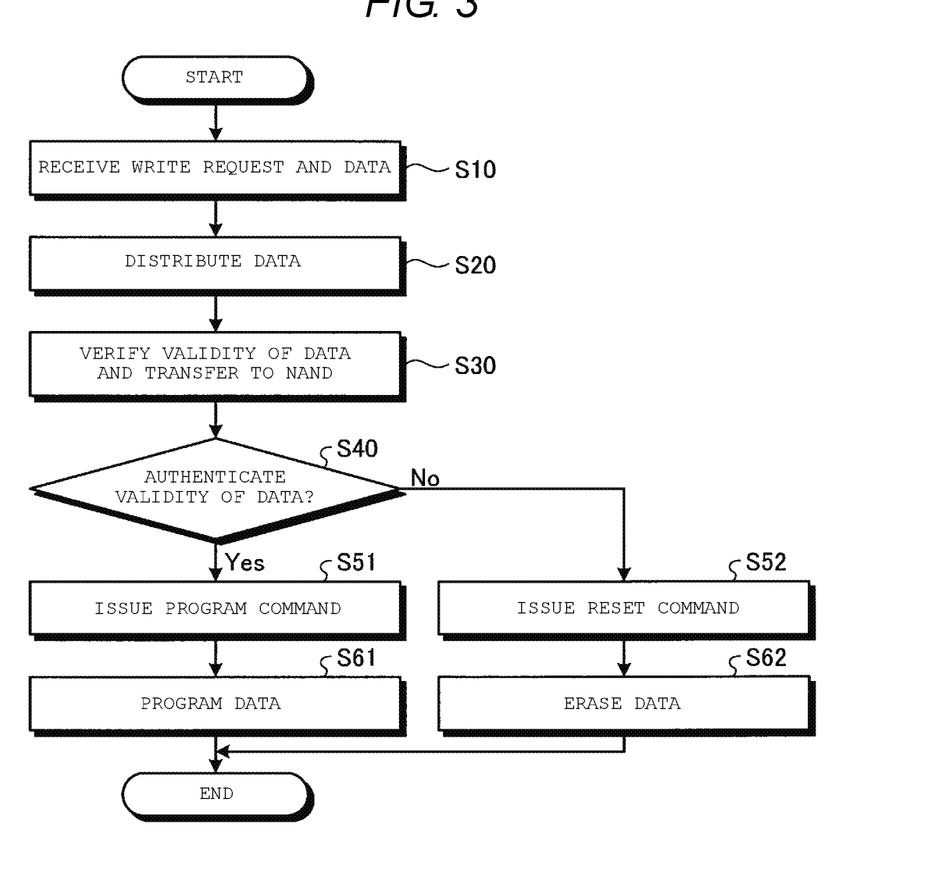
FIG. 3 is a flowchart illustrating an example of a procedure of data processing of the memory system according to at least one embodiment.

Next, using FIG. 3, when a write request is received from the host 30, the data processing example of the memory system 1 will be described. FIG. 3 is a flowchart illustrating an example of a procedure of data processing of the memory system 1 according to at least one embodiment. In FIG. 3, it is assumed that the host 30 sends the shared key necessary for verifying the data to the memory system 1 in advance.

When the memory system 1 receives a write request and write data from the host 30 (Step S10), the control unit 11 of the memory controller 10 temporarily stores the data in any of the storage areas 14*a* to 14*c* of the data buffer 14. Hereinafter, the storage destination of the data from the host 30 is also referred to as a storage area 14*x*. Also, the data hashed by the operation unit 16 is temporarily stored in any of the storage areas 14*a* to 14*c*. Hereinafter, the storage destination of the operated data is also referred to as a storage area 14*y*.

The transfer path control unit 17 transfers the data of the storage area 14*x* to the internal RAM 21 of the NAND memory 20. The transfer path control unit 17 transfers the data stored in the storage area 14*x* to the operation unit 16. In this manner, the transfer path control unit 17 distributes the data from the host 30 to the internal RAM 21 and the operation unit 16 (Step S20).

More specifically, the memory controller 10 sequentially receives the data from the host 30, stores the data in the storage area 14*x*, and transfers the data to the operation unit 16 by the transfer path control unit 17. The operation unit 16 sequentially executes a hash operation on the transferred data to obtain a MAC value. Concurrently, the control unit 11 issues a data-in command, and sequentially transfers the data stored in the storage area 14*x* from the transfer path control unit 17 to the internal RAM 21 of the NAND memory 20 via the memory I/F 13 (Step S30). At this time, it is preferable that the storage area 14*x* in which the data from the host 30 is stored and the storage area 14*y* in which the operated data is stored are different storage areas 14*a* to 14*c*. Thus, it is possible to further speed up the data transfer. Further, the storage destination of the data may be changed by the data processing based on the RPMB standard and the data processing based on the specification of the memory system 1.

The operation unit 16 compares the MAC value calculated by the host 30 and the obtained MAC value to determine whether to authenticate the validity of the data (Step S40).

When both MAC values match, the operation unit 16 authenticates the validity of the data (Step S40: Yes). The control unit 11 issues a program command to the NAND memory 20 (Step S51), and causes the data transferred to the internal RAM 21 to be programmed in a predetermined area in the memory cell array 22 (Step S61).

When both MAC values do not match, the operation unit 16 denies the validity of the data (Step S40: No). The control unit 11 issues a reset command to the NAND memory 20 (Step S52), and erases the data transferred to the internal RAM 21 (Step S62). Thus, the state of the NAND memory 20 returns to a command standby state. The memory controller 10 issues an error notice to the host 30 when the confirmation request of the write result is issued from the host 30 or at any appropriate time by the memory controller 10.

Thus, the data processing of the memory system 1 is completed.

Comparative Example

Figure 4:
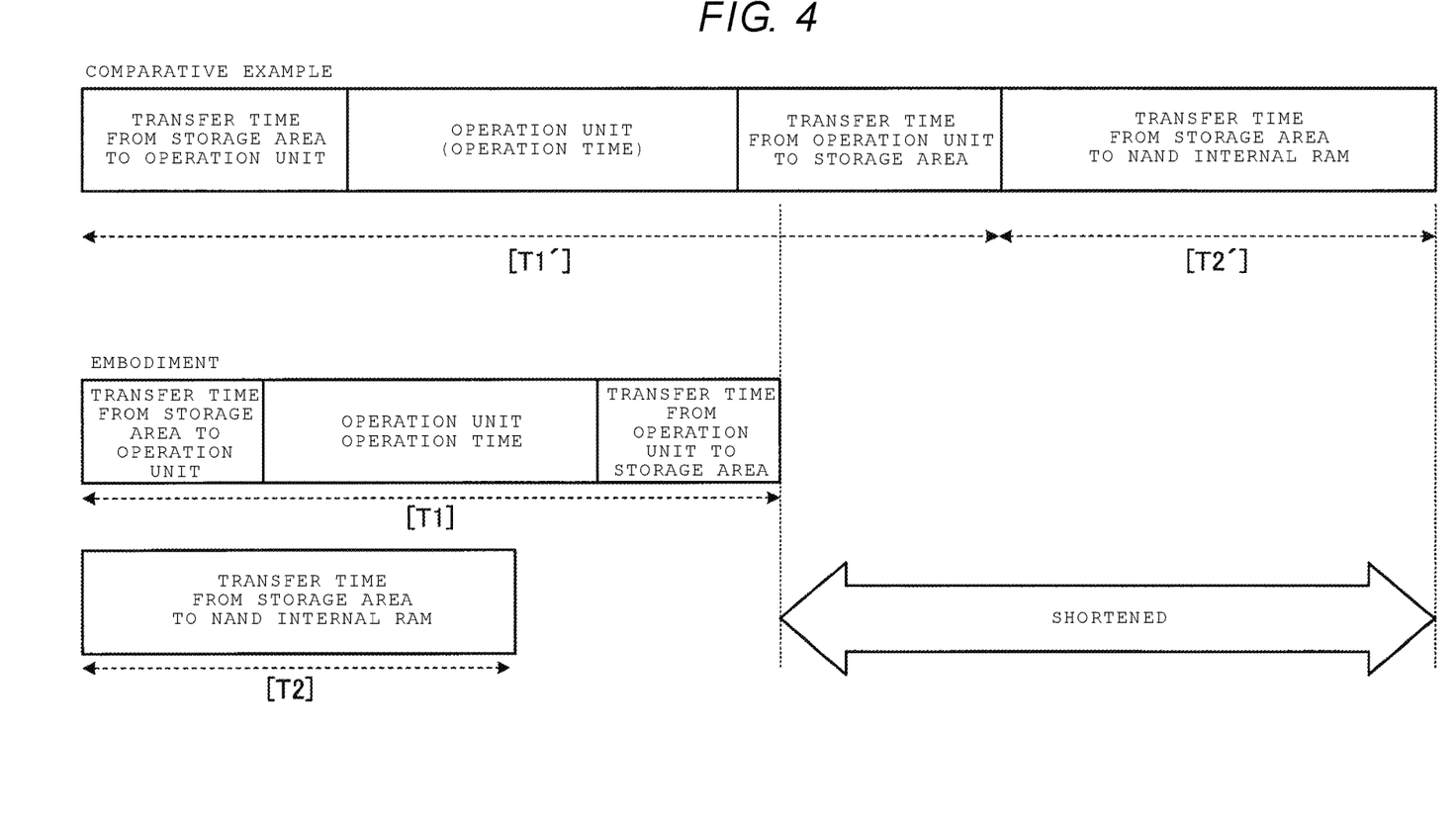
FIG. 4 is a diagram for comparing a transfer method of the memory system according to at least one embodiment with a transfer method of a memory system according to a comparative example.

Next, a memory system of a comparative example will be described using FIG. 4. FIG. 4 is a diagram for comparing a transfer method of the memory system 1 according to the embodiment with a transfer method of the memory system of the comparative example.

In the memory system of the comparative example, data to be transferred from the host is sequentially transferred to the storage area of the data buffer, the operation unit, and another storage area, the internal RAM of the NAND memory. That is, the data transferred from the storage area of the data buffer to the operation unit is subjected to a hash operation in the operation unit. Then, only when the derived MAC value matches the MAC value from the host, the data is transferred to the internal Ram of the NAND memory via another storage area.

Usually, the data of the plurality of frames are transferred from the host. The hash operation is performed for each frame, and the result is used for the operation of the next frame. Thus, the processing in the operation unit is a serial process. Therefore, it takes a long time until the processing in the operation unit is completed. That is, the time T2' which is the transfer time to the internal RAM of the NAND memory is added as it is to the time T1' including the processing time in the operation unit. Therefore, it takes a long time for the write process accompanying the operation of verifying the validity of the data.

In the memory system. 1 of at least one embodiment, data processing in the operation unit 16 is performed in parallel with data transfer to the internal RAM 21 of the NAND memory 20. That is, the operation of the time T2 is performed within the time T1. Thus, the time (T1 (T2)) in the embodiment is remarkably shortened compared to the time (T1'+T2') in the comparative example. Therefore, it is possible to speed up the write process accompanying the operation of verifying the validity of the data in the memory system 1 of at least one embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory having a memory cell array configured to store data in a non-volatile manner; and
a memory controller configured to transfer data received from a host to the non-volatile memory in parallel with execution of an operation of verifying validity of the data,
wherein the non-volatile memory includes an internal buffer configured to temporarily store data,
wherein the memory controller is configured to transfer the data to the internal buffer, and determine whether to execute a program for storing the data of the internal buffer to the memory cell array of the non-volatile memory in a non-volatile manner according to a result of the operation, and
wherein the memory controller is configured to issue a program command for allowing programming of the data to the memory cell array of the non-volatile memory when validity of the data is authenticated, as a result of the operation, and issue a reset command for returning a state of the non-volatile memory into a command standby state without performing programming of the data to the memory cell array when validity of the data is denied.

2. The memory system according to claim 1, wherein the memory controller is configured to allow programming of the data to the memory cell array of the non-volatile memory when validity of the data is authenticated, as a result of the operation, and to not perform programming of the data to the memory cell array when validity of the data is denied.

3. The memory system according to claim 2, wherein the memory controller is configured to, when validity of the data is denied, transmit an error notification to the host.

4. The memory system according to claim 1, wherein the memory controller is configured to, when validity of the data is denied, transmit an error notification to the host.

5. The memory system according to claim 1, wherein the memory controller is configured to, when the reset command is issued, erase the data transferred to the internal buffer.

6. The memory system according to claim 1, wherein the memory controller is configured to
receive the data to which a MAC value is given from the host,
execute a hash operation on the data using a key shared with the host to derive a MAC value,
authenticate validity of the data when the derived MAC value matches the MAC value given to the data, and
deny validity of the data when the derived MAC value does not match the MAC value given to the data.

7. The memory system according to claim 1, wherein the memory system is one of a memory card, or a solid state drive.

8. The memory system according to claim 1, wherein the non-volatile memory includes at least one of a NAND memory, a NOR type flash memory, a three-dimensional structure flash memory, a resistance random access memory (ReRAM), or a ferroelectric random access memory (FeRAM).

9. A method of operating a memory system including a non-volatile memory having a memory cell array configured to store data in a non-volatile manner and an internal buffer configured to temporarily store data, and a memory controller, the method comprising:
transferring data received from a host to the internal buffer of the non-volatile memory in parallel with execution of an operation of verifying validity of the data,
determining whether to execute a program for storing the data of the internal buffer to the memory cell array of the non-volatile memory in a non-volatile manner according to a result of the operation, issuing a program command for allowing programming of the data to the memory cell array of the non-volatile memory when validity of the data is authenticated, as a result of the operation; and issuing a reset command for returning a state of the non-volatile memory into a command standby state without performing programming of the data to the memory cell array when validity of the data is denied.

10. The method according to claim 9, further comprising:

allowing programming of the data to the memory cell array of the non-volatile memory when validity of the data is authenticated, as a result of the operation, and not performing programming of the data to the memory cell array when validity of the data is denied.

11. The method according to claim 10, wherein when validity of the data is denied, transmitting an error notification to the host.

12. The method according to claim 9, wherein when validity of the data is denied, transmitting an error notification to the host.

13. The method according to claim 9, wherein when the reset command is issued, erasing the data transferred to the internal buffer.

14. The method according to claim 9, further comprising:

receiving the data to which a MAC value is given from the host, executing a hash operation on the data using a key shared with the host to derive a MAC value, authenticating validity of the data when the derived MAC value matches the MAC value given to the data, and denying validity of the data when the derived MAC value does not match the MAC value given to the data.

* * * * *